(No Model.) 2 Sheets—Sheet 1.
J. H. HIGGINS.
GLASS MAKING FURNACE.
No. 587,673. Patented Aug. 3, 1897.
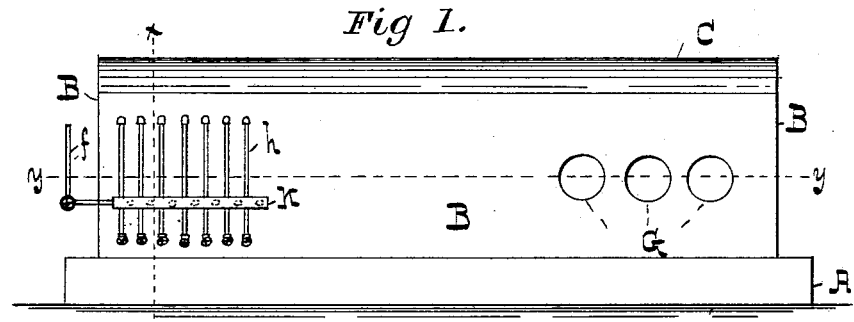
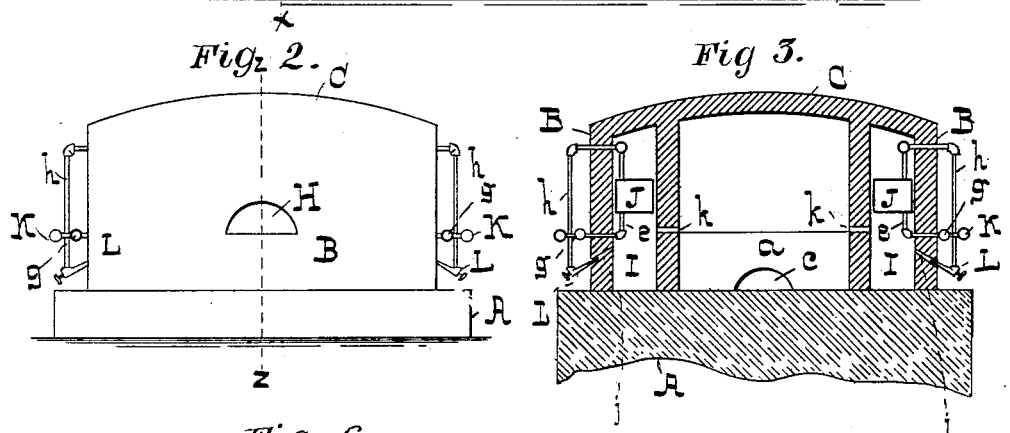
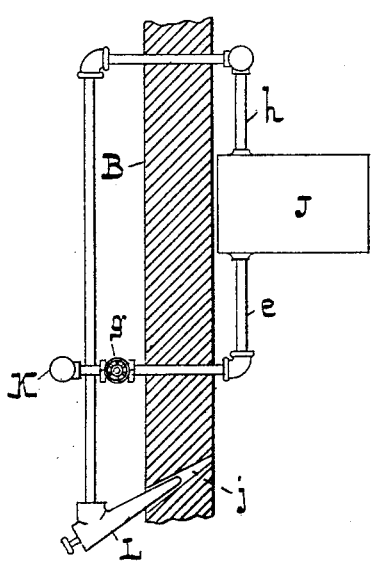
Witnesses.
Dan'l Fisher
Harry Constantine
Inventor.
John H. Higgins,
by W. T. Howard,
atty.
THE NORRIS PETERS CO., PHOTO-LITHO., WASHINGTON, D. C.

(No Model.) 2 Sheets—Sheet 2.
J. H. HIGGINS.
GLASS MAKING FURNACE.

No. 587,673. Patented Aug. 3, 1897.

Witnesses
Dan'l Fisher
Harry Constantine

Inventor.
John H. Higgins,

UNITED STATES PATENT OFFICE.

JOHN H. HIGGINS, OF BALTIMORE, MARYLAND, ASSIGNOR OF TWO-THIRDS TO LEOPOLD BRAUN AND REUBEN A. McCAULEY, OF SAME PLACE.

GLASS-MAKING FURNACE.

SPECIFICATION forming part of Letters Patent No. 587,673, dated August 3, 1897.

Application filed September 12, 1896. Serial No. 605,605. (No model.)

*To all whom it may concern:*

Be it known that I, JOHN H. HIGGINS, of the city of Baltimore, and State of Maryland, have invented certain Improvements in Glass-Making Furnaces and Their Tanks, of which the following is a specification.

In the description of the said invention which follows reference is made to the accompanying drawings, forming a part hereof, and in which—

Figure 4:
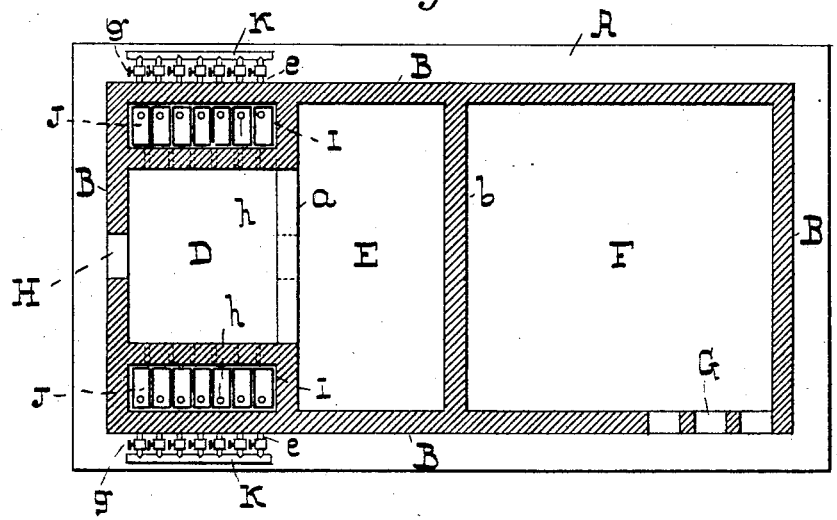
Figure 5:
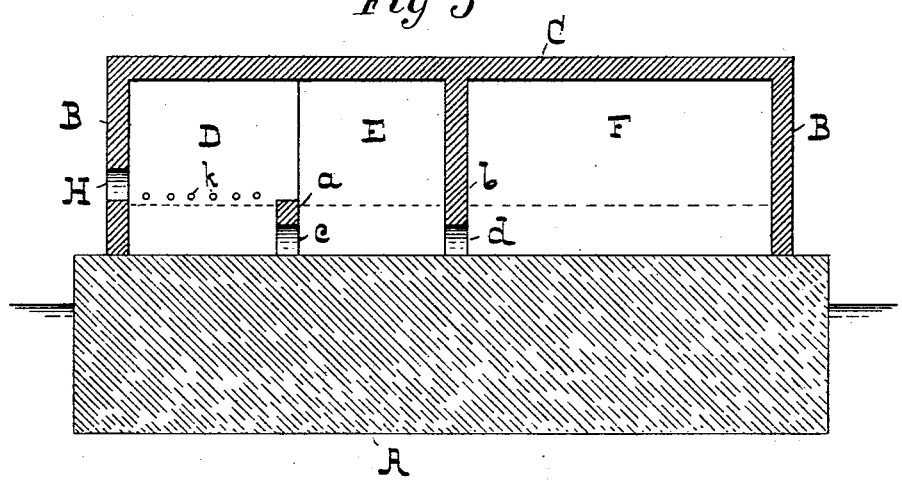

Figure 1 is an exterior side view of the improved furnace and tank. Fig. 2 is an exterior front view. Fig. 3 is a section of Fig. 1, taken on the dotted line $x x$. Fig. 4 is a sectional plan taken on the dotted line $y y$. Fig. 5 is a section of Fig. 2, taken on the dotted line $z z$. Fig. 6 is an enlarged detail hereinafter described.

Referring now to the drawings, A is the foundation of the structure, made of stone and extending above the ground-line. The other part of the structure is made of firebrick.

B B are the exterior walls of the furnace and tank, and C is the crown. The lower portion of the furnace, which holds the melted glass, is designated the "tank," and it is divided by the partition-walls $a$ and $b$ into the melting, clearing, and gathering chambers, respectively represented by D, E, and F.

The wall $a$, which separates the melting-chamber from the clearing-chamber, rises only to about the surface of the melted glass, which is represented by a dotted line, but the two bodies of glass in the said chambers are in communication by means of the tunnel $c$.

The wall $b$ rises from the foundation to the crown, and it has a tunnel $d$, whereby the melted glass can flow from the clearing-chamber to the gathering one.

The gathering-chamber has the usual holes G, through which the glass is taken, and the melting-chamber is provided with the usual feed-opening H.

At each side of the melting-chamber is a heating-chamber I, having therein a series of oil or hydrocarbon boxes J, (see Fig. 6,) connected by pipes $e$ to a manifold K, from which extends a pipe $f$, leading to any source of supply of oil. The pipes are provided with suitable valves $g$, whereby the flow of oil is regulated. Each box J has a pipe $h$ leading from its top through the wall A and then down to a burner L, the end of which is in an aperture $j$, leading into the heating-chamber. The burners are of the usual description, and there is a space around each burner for the entrance of air. The heating-chamber is in communication with the interior of the furnace above the melted-glass line by means of a series of ducts $k$.

The air admitted to the heating-chamber is not sufficient to effect complete combustion of the vapor from the boxes J, but forms carbonic oxid, which passes into the furnace through the ducts $k$ and there meeting with a new supply of oxygen complete combustion takes place, which thoroughly heats the glass from the upper side.

It will be understood that the heat in the heating-chamber is, however, sufficient to generate vapor in the boxes J and cause it to pass to the heating-chamber.

I have shown the burners as applied to the melting-chamber only, but is evident that they may be applied to any other part of the furnace. It is thought that the arrangement of burners as described will be sufficient in nearly all cases to thoroughly melt the glass and keep it in a proper condition for working.

I claim as my invention—

In a glass-making tank-furnace, the combination with the glass-melting chamber, of a gas-heating chamber, the two chambers being connected interiorly by a system of ducts, a series of boxes within the gas-heating chamber, a manifold situated exteriorly of the gas-heating chamber with a pipe leading to a source of supply of hydrocarbon, a hydrocarbon-supply pipe leading from the said manifold to the bottom of each box, the said pipe having therein a controlling cock or valve, a second pipe leading from the top of each box through the outer wall of the gas-heating chamber, and down to a point below the said box, and a burner on the end of the said pipe, arranged to deliver vapor generated in the box to the gas-heating chamber, substantially as specified.

JOHN H. HIGGINS.

Witnesses:
 DANL. FISHER,
 WM. T. HOWARD.